United States Patent [19]

Holm et al.

[11] 4,309,742
[45] Jan. 5, 1982

[54] ARTICULATED TRACTOR TIRE ILLUMINATION ARRANGEMENT

[75] Inventors: Charles H. Holm, Plainfield; William L. Schubert, Downers Grove, both of Ill.; Howard E. Sitorius, Tempe, Ariz.

[73] Assignee: International Harvester Company, Chicago, Ill.

[21] Appl. No.: 114,452

[22] Filed: Jan. 22, 1980

[51] Int. Cl.³ ............................................. B60Q 1/26
[52] U.S. Cl. ..................................... 362/78; 180/89.1; 180/900
[58] Field of Search ............... 280/400; 180/89.1, 900; 362/61, 78, 80, 82, 83

[56] References Cited

U.S. PATENT DOCUMENTS

| 1,624,436 | 4/1927 | Rosemier | 362/83 |
| 1,818,126 | 8/1931 | Germain | 362/61 |
| 1,842,800 | 6/1932 | Rhodes | 362/61 |
| 2,036,435 | 4/1936 | Phelps | 362/81 |
| 2,694,773 | 11/1954 | Knopp et al. | 362/61 |
| 2,788,858 | 4/1957 | Aasland et al. | 180/900 |
| 3,270,829 | 9/1966 | Steiger et al. | 180/900 |
| 3,863,951 | 2/1975 | Barth | 280/400 |

FOREIGN PATENT DOCUMENTS

| 144297 | 1/1936 | Fed. Rep. of Germany | 362/83 |
| 828642 | 1/1952 | Fed. Rep. of Germany | 362/83 |
| 544813 | 6/1956 | Italy | 362/61 |
| 616141 | 1/1961 | Italy | 362/61 |
| 755365 | 8/1956 | United Kingdom | 362/61 |

Primary Examiner—L. T. Hix
Assistant Examiner—Alan Mathews
Attorney, Agent, or Firm—Douglas W. Rudy; F. David AuBuchon

[57] ABSTRACT

A tire illumination arrangement for an articulated tractor. The tractor has front and rear sections pivotally connected along an axis of articulation with a source of electric current mounted on one of the sections. The front and rear sections are each supported by a pair of ground engaging tires, which are mounted on and for rotation with an axle. In addition, the front section tires each have an inner surface which face opposite sides of the front section. The arrangement utilizes a lighting device which is electrically connected to the source of electric current. The lighting device is mounted on the front section, below and rearward of the front axle. This arrangement also utilizes a mechanism, interposed in the electrical connection between the lighting device and the source of electric current, to selectively supply the device with a flow of electric current from the source. When the device receives a flow of electric current from the source, it produces a forwardly oriented pattern of light to illuminate the inner surfaces of the front tires.

7 Claims, 2 Drawing Figures

U.S. Patent    Jan. 5, 1982    4,309,742
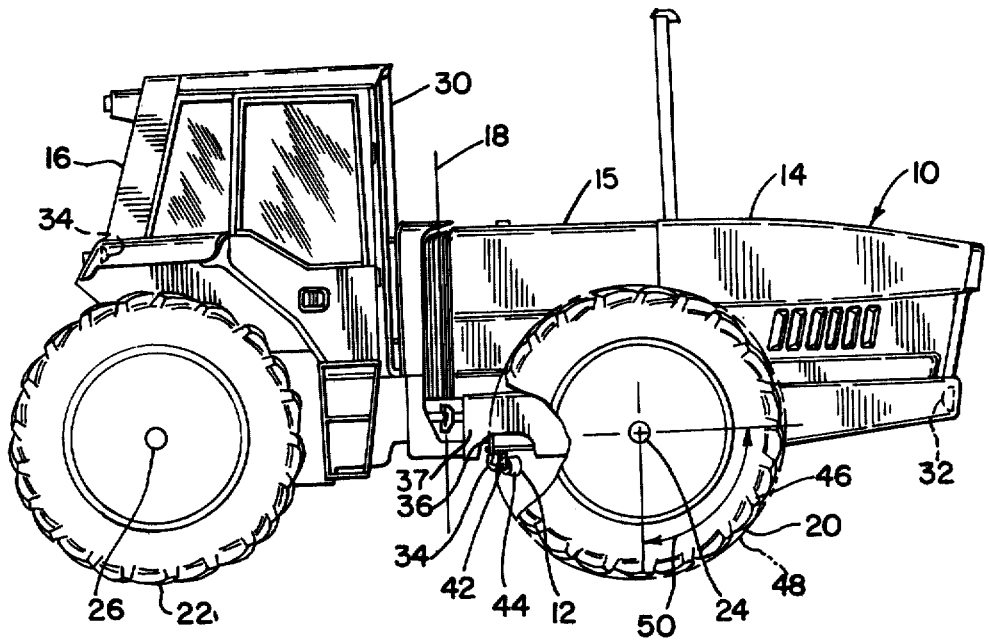
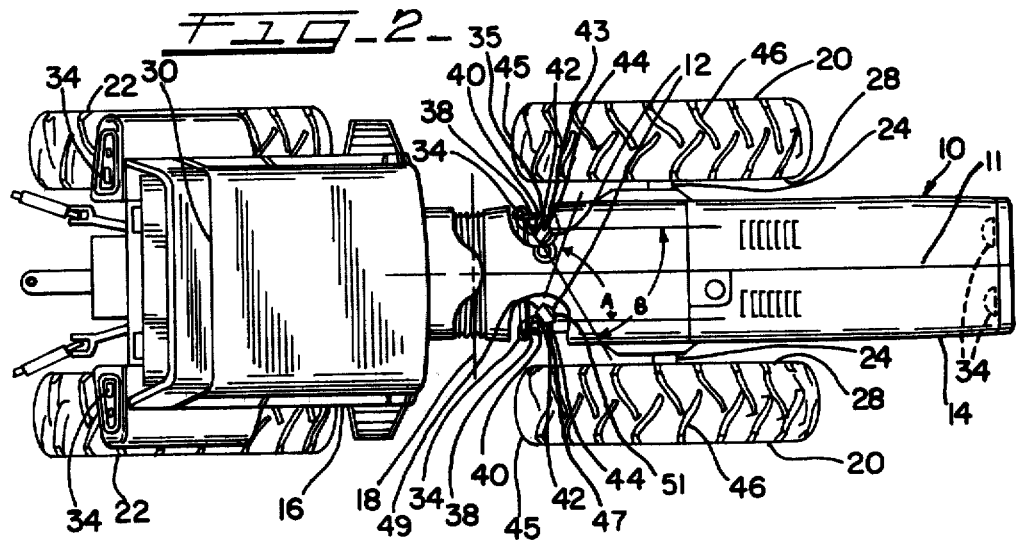

ARTICULATED TRACTOR TIRE ILLUMINATION ARRANGEMENT

BACKGROUND OF THE INVENTION

This invention relates generally to articulated tractors, and more particularly concerns a lighting arrangement for the tires of the tractor.

The trend in today's agricultural industry is to maximize the efficiency of each crop producing unit of land by increasing the size of the units. The larger units minimize the manual labor involved in farming by making it possible to effectively utilize large horsepower tractors and their related implements.

As the horsepower requirements of tractors increases, it becomes more economical and efficient to design, build, and use a tractor that is articulated. The articulated tractors become the preferred type, because the two-wheel-drive and the four-wheel-drive designs can produce the higher tractive efforts required by the higher horsepower of the tractor, without sacrificing the tractor's maneuverability.

To fully capitalize on the benefits of the two and four-wheel-drive articulated tractors, the farmer must be able to operate them twenty four hours a day during the extremely brief, but critical, planting and harvesting seasons. The conventional lights for illuminating the front tires of articulated tractors are secured to the front of the tractor cab. The cab is conventionally positioned on the front section, behind the front axle, with the lights located above and to the rear of the tires, when the tires are set at the standard tread width.

This conventional arrangement is satisfactory when the tractor is being used in the production of non-row crops, e.g. wheat, because the operator does not need to precisely position the tractor tires with respect to the crops. However, the conventional lighting arrangement does not provide adequate illumination of the front tires to allow the operator to steer the tractor through a field of row crops, e.g. corn, soy beans, and sun flowers, after the sun has set, because the operator must precisely position the tires with respect to these crops.

When the conventional articulated tractor is used for row crops operations, the operator's steering ability will be impaired for two reasons. The first reason being the intermittent reflection of light off the tread of the front tires. This reflection produces a strobe light effect that will inhibit the operator's ability to concentrate on the tire/crop positioning, thereby decreasing his steering accuracy.

The second reason for the operator's impaired steering ability is the shadows produced by the tires when they are set at a minimum tread spacing. Under these conditions, the tires cast shadows on their inside surfaces that obscure the operator's view of them. This obscured vision decreases the operator's steering ability by making an accurate positioning of the tires with respect to the crop extremely difficult.

If an attempt was made to improve the operator's nighttime steering ability by relocating the cab on the rear section of the articulated tractor, the cab mounted lights would still not produce adequate illumination for the operator. Although the lights would be further behind the front tires, the above mentioned strobe light effect and narrow tread spacing shadows would still impair the operator's night steering ability.

In addition, the lights being mounted on the rear section would create a new impairment situation, because the lights will move away from the tires when the front section rotates with respect to the rear section during a turn. In this situation, the operator's visibility of the tires will decrease, which will again impair his ability to accurately steer the tractor during nighttime row crop operations.

If another attempt is made to improve the nighttime steering ability of the operator by supplementing the above arrangements with the structure establishing the wheel base lighting in U.S. Pat. No. 1,818,126, the new system would still fail to provide the necessary tire illumination. The addition of the '126 structure still fails to provide a workable system, because it was developed for utilization on a moving automotive or truck type vehicle to provide illumination of the moving vehicle's wheel base for the benefit of the operator of an oncoming vehicle. In achieving its goal, the '126 system positioned a downwardly and rearwardly oriented light in front of and above the vehicle's front axle.

Since the '126 arrangement was not developed to assist the operator of the illuminated vehicle, it is not surprising to find four factors that limit its effectiveness, when its light position and orientation are applied to an articulated tractor. The rearward orientation along produces the first two limiting factors. First, the light will be directly reflected toward the operator off the ground, tires and wheels. This reflection will severely limit the operator's visibility of the inside surface of the tires, thereby diminishing his ability to accurately steer the tractor. Secondly, the light reflecting off the tire treads will again produce the above mentioned steering ability inhibiting strobe light effect.

The next limiting factor of the application of the '126 structure to an articulated tractor is the restriction of the illumination of the '126 light to the rear half of the front tires inner surfaces. With this particular tire illumination, the operator will only know the actual position of the tires with respect to the crop. He will not have the ability to anticipate adjustments in the tires/crop position, because he will not see the crop until it is under the tire and/or the axle. Since the operator cannot anticipate turning adjustments, his ability to accurately steer the tractor will again be diminished.

The last limiting factor of the '126 lighting of an articulated tractor arises from the difference between the axle of an articulated tractor, in particular a four-wheel-drive tractor, and the axle of an automotive or truck type vehicle. The axle of the tractor is much larger than the axle of the '126 type vehicle. With the '126 light positioned in front of and above the tractor's larger axle, a very large shadow will be produced in the already limited illumination pattern. This large shadow will severely limit the operator's visibility of the tire, thereby again diminishing his ability to accurately steer the tractor in night row crop production operations.

In light of the fact that none of the above lighting arrangements give the articulated tractor operator sufficient tire illumination to accurately steer the tractor during nighttime row crop operations, the tractor will destroy the crops during these operations. Since a farmer must be able to use his tractor for both day and night operations without damaging the crops, the benefits of the high horsepower articulated tractors cannot be enjoyed by the farmer since he cannot use a crop-destroying tractor in producing his row crops.

Accordingly, it is an object of the present invention to provide a tire illumination arrangement for an articulated tractor which will make it possible to use the tractor for nighttime row crop operations.

With more particularity, it is an object of the present invention to provide an articulated tractor with a row crop tire illumination arrangement that will not impair the operator's night steering ability by breaking his concentration with a strobe light type reflection off the tread of the tires.

Similarly, it is an object of the present invention to provide a row crop tire illumination arrangement for a tractor that will not diminish the operator's night steering ability by interrupting his view of the front tires with straight reflections of light off the tires, the ground, or the wheels.

Additionally, it is an object of the present invention to provide an articulated tractor with a row crop tire illumination arrangement which has an illumination pattern that is free of limitations or interruptions caused by shadows produced by components of the tractor.

Finally, it is an object of the present invention to provide an articulated tractor row crop tire illumination arrangement that gives the operator the ability to anticipate turns by continuously illuminating the lower front quadrant of the inner surfaces of the front tires.

SUMMARY OF THE INVENTION

A tire illumination arrangement for an articulated tractor. The tractor has front and rear sections pivotally connected along an axis of articulation with a source of electric current mounted on one of the sections. The front and rear sections are each supported by a pair of ground engaging tires, which are mounted on and for rotation with an axle. In addition, the front section tires each have an inner surface which face opposite sides of the front section. The arrangement utilizes a lighting device which is electrically connected to the source of electric current. The lighting device is mounted on the front section, below and rearward of the front axle. The arrangement also utilizes a mechanism, interposed in the electrical connection between the lighting device and the source of electric current, to selectively supply the device with a flow of electric current from the source. When the device receives a flow of electric current from the source, it produces a forwardly oriented pattern of light to illuminate the inner surfaces of the front tires.

BRIEF DESCRIPTION OF THE DRAWINGS

Other objects and advantages of the invention will become apparent upon reading the following detailed description and upon reference to the drawings, in which:

FIG. 1 is a right side view of an articulated tractor incorporating the present invention; and FIG. 2 is a top view of the articulated tractor of FIG. 1.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

Turning first to FIG. 1, there is shown a tractor generally 10 incorporating the lighting device 12 of the present invention. The tractor 10 utilizes a front section 14 and a rear section 16 which are pivotally connected along the articulation axis 18 of the tractor 10. The longitudinal centerline of the tractor, represented by construction line 11 in FIG. 2, passes through the articulation axis 18. The front 14 and rear 16 sections are each supported by ground engaging front 20 and rear 22 tires. The front section 14 includes a body portion 15 for housing an engine (not shown), the body portion extending longitudinally forward from the axis of articulation. The body includes left 35 and right 37 lower trailing portions on the lower trailing respective left and right sections of the front portion 14 of the vehicle. The front 20 and rear 22 tires are each mounted on and for rotation with front 24 and rear 26 axles. Both the front and rear axles are perpendicularly fixed relative to the longitudinal centerline of the tractor to the respective front and rear portions of the tractor. The front tires 24, each having an outside diameter defining said tire's profile 48 in elevation, each have inner surfaces 28 which face opposite sides of the front section 14 or more clearly, face adjacent sides of said front section body portion, thus the front section is partially contained between the inner surfaces of said front section tires as shown in FIGS. 1 and 2. It can also be seen that the front and rear section tires are similar in elevation profile.

The tractor 10 of the illustrated embodiment also has a cab or operator station 30 mounted on the tractor rear section 16. The operator can see the inner surfaces of each of the front section tires from his station even when the tractor is being driven straight and both the front and rear sections are aligned with the longitudinal centerline of the tractor. The cab 30 contains a switch and a battery (not shown) which the tractor operator uses to supply electrical current to the tractor's front lights 32 and rear lights 34.

In keeping with the invention, the cab 30 also contains a switch (not shown) which the operator uses to selectively supply electrical current from the battery to the lighting device 12. The current travels from the battery to the switch and to the lighting device 12 in cable 34. The cable 34 is secured by nuts and bolts (not shown) to the frame 36 of the front section 14. The cable is secured in close proximity to the lighting device 12 by the cable clip 38.

The lighting device 12 of the preferred embodiment is also secured to the frame 36 of the front section 14. The illustrated lighting device 12 incorporates a pair of brackets 40 which are rigidly secured to the frame 36 by a plurality of nuts and bolts (not shown). The brackets 40 are also rigidly secured to a second pair of bracket 42 by another plurality of nuts and bolts (not shown).

When the brackets 40 and 42 have been secured, then the preferred embodiment's pair of flood lights 44 are adjustably secured to the second brackets 42. The flood lights 44 are adjusted to insure their illumination pattern, depicted as arcs A and B in FIG. 2, will be beamed forward to exclude the rear portion 45 of the tire treads 46. This orientation eliminates the strobe light reflection effect and the straight reflection effect which plagued the conventional lighting arrangement.

A study of FIGS. 1 and 2 shows that each of the preferred embodiment's flood lights 44 are secured underneath a front section 14, out of the line of sight from the operator's station of the tractor, to sides of the front section that are opposite from the front section sides adjacent the inner surfaces which the individual floodlights are illuminating that is, a first light 43 is mounted to the left lower trailing portion and a second light 47 is mounted to the right lower trailing portion of the front portion of the tractor. In addition, the floodlights are located within the elevation profile 48 of the front tires 20 (see FIG. 1). This particular location insures the illumination of a substantial portion of the lower front quadrant 50 of the inner surfaces 28 of the front tires, thereby minimizing the shadows that are cast by the front axle 24 of the tractor 10. Each light incorporates a housing and a lens, for instance 49 and 51 of the second light 43, for directing each light's illumination pattern. The lenses are aligned to disburse light transversely across the longitudinal centerline and additionally, parallel to the centerline, toward the tire opposite the side of the centerline on which the light is mounted. FIG. 2 shows that left side light 43 has a light distribution pattern B while right side light 47 has a light distribution pattern A both of which are less than 90°. The housings and lenses of the first and second lights prevent respective first and second lights from illuminating the adjacent inner surfaces of respective right and left forward section tires.

The preferred embodiment substantially illuminates this quadrant, even with its very large front axle which is required by its four-wheel-drive design. The power train of the preferred embodiment is fully set forth in the commonly owned application invented by Mr. Anthony M. Kestian and Mr. Raymond J. Allori, entitled Articulated Tractor Power Train. The power train application was filed on the same day as the present application and is hereby incorporated by reference. With the lower front quadrant illuminated in both the two and four-wheel-drive articulated tractor designs, the operator will be able to anticipate turns, and accurately steer the tractor through non-linear rows of crops during both night and daytime operations.

A further study of FIGS. 1 and 2 will show that securing the lighting device 12 to the front section 14 has eliminated the visibility problems caused by turning the tractor. It is apparent that a front mounted lighting device 12 will not have its illumination patterns A and B altered by angular displacement between the front 14 and rear 16 sections which occur when the tractor is turned. With a constant illumination pattern, the operator's steering ability cannot be effective by the angle between the tractor sections.

Thus it is apparent that there has been provided in accordance with the invention, a row crop tire illumination arrangement for an articulated tractor that will give the tractor operator the ability to accurately steer the tractor during night operations by illuminating the inner surface of the front tires. In addition, the operator's visibility of this surface will not be impaired by straight or strobe light light reflection of shadows during the nighttime row crop operations. Therefore, the present invention fully satisfies the objects, aims and advantages set forth above. While the invention has been described in conjunction with specific embodiment thereof, it is evident that many alternatives, modifications and variations will be apparent to those skilled in the art in light of the foregoing description. Accordingly, it is intended to embrace all such alternatives, modifications and variations as followed in the spirit and broad scope of the appended claims.

What is claimed is:

1. In an articulated tractor having a longitudinal centerline and having front and rear sections pivotally connected at an axis of articulation, said rear section supporting an operator's work station, said front section having a body portion for housing an engine extending forward from said axis of articulation and including left and right lower trailing portions of said front section, each of said sections supported by left and right side ground engaging tires mounted for rotation on axles perpendicularly fixed relative to said longitudinal centerline of said tractor, each of said front section tires having an outside diameter defining said tire's profile in elevation and having an inner surface facing adjacent sides of said front section body portion, said front section tires located outboard of said front section body portion wherein said body portion of said front section is pivotally contained between said inner surfaces of said front section tires, wherein the improvement comprises:

a first light mounted on said left lower trailing portion within said profile of said front section tire, said first light having a housing and lens whereby said light's illumination pattern defines an arc B of less than 90°, said first light fixedly mounted wherein said lens is aligned to disburse light transversely across said longitudinal centerline and additionally parallel to said longitudinal centerline of said articulated tractor toward said right side tire forward of said front section axle;

a second light mounted on said right lower trailing portion within said elevation profile of said front section tire having a housing and lens whereby said light's illumination pattern defines an arc A of less than ninety degrees, said second light fixedly mounted wherein said lens is aligned to disburse light transversely across said longitudinal centerline and additionally parallel to said longitudinal centerline toward said left side tire forward of said front section axle.

2. The invention in accordance with claim 1, wherein said housings and lenses of said first and second lights prevent respective first and second lights from illuminating said inner surfaces of respective left and right forward section tires.

3. The invention in accordance with claim 1, wherein said first and second lights are out of the line of sight from said operator's station of said articulated tractor.

4. The invention in accordance with claim 1, wherein a portion of a lower forward quadrant of said inner surface of each of said front section tires is visible from said operator's station of said articulated tractor when said front and rear sections are aligned with said longitudinal centerline of said tractor.

5. The invention in accordance with claim 1, wherein said housings of said lights shield the trailing tread sections from illumination by said lights.

6. The invention in accordance with claim 1, wherein said front and said rear section tires are similar in elevation profile.

7. The invention in accordance with claim 1, wherein said first and said second lights are mounted behind and below the centerpoint of said front axle.

* * * * *